United States Patent Office 3,829,526
Patented Aug. 13, 1974

3,829,526
HYDROGENATED POLYPHENOLS AS SULFUR
SOLUBILIZERS IN POLYTHIOL SEALANTS
Richard C. Doss and Moses L. Thomas, Bartlesville,
Okla., assignors to Phillips Petroleum Company
No Drawing. Filed Apr. 20, 1973, Ser. No. 346,830
Int. Cl. C08g 17/04, 51/28
U.S. Cl. 260—75 S                                11 Claims

ABSTRACT OF THE DISCLOSURE

Sealant and coating formulations are prepared by curing a mixture comprising (a) a polymercaptan terminated polymer such as a poly(oxyalkylene)-polyester-poly(monosulfide)-polythiol having an average of more than two mercapto groups per molecule, (b) a hydrogenated polyphenyl containing dissolved sulfur, and (c) a curing agent.

---

This invention relates to sealant and coating formulations containing polymercaptan terminated polymers. In accordance with another aspect, this invention relates to the use of hydrogenated polyphenyls as solubilizers for elemental sulfur incorporated into sealant or coating formulations comprising polymercaptan terminated polymers. In accordance with another aspect, this invention relates to the preparation of sealant or coating compositions by curing a mixture comprising a poly(oxyalkylene) - polyester - poly(monosulfide)-polythiol having an average of more than two mercapto groups per molecule, a minor amount of a hydrogenated polyphenyl containing dissolved sulfur and a curing agent. The incorporation of sulfur dissolved in a hydrogenated polyphenyl into a poly(oxyalkylene)-polyester-poly(monosulfide) - polythiol as defined, together with a curing agent, produces cured sealants having highly elastomeric qualities.

Accordingly, it is an object of this invention to provide sealants based on polymercaptan terminated polymers.

It is another object of this invention to provide a process for the production of improved sealant fomulations.

Another object of this invention is to provide polymercaptan terminated polymers which are curable to sealants having improved properties.

Another object of this invention is to provide cured sealant compositions having improved toughness characteristics.

Other aspects, objects and the several advantages of this invention will be apparent to those skilled in the art from a study of this disclosure and the appended claims.

An important function of the elemental sulfur is its ability to convert lead mercaptide bonds, which are formed when lead dioxide is used as a curing agent, to disulfide linkages, the conversion of lead mercaptide bonds to disulfide linkages resulting in a polymer of greater strength and improved resistance to heat degradation. Sulfur also serves as an adhesion promoter and provides some curing of the polymer. However, if elemental sulfur in powdered form is incorporated in the polymer, the polmer cures around the individual sulfur particles to produce imperfections which cause cured specimens of the polymer to fail. Therefore, it is important to dissolve the sulfur in a solvent prior to incorporating the sulfur into the polymer.

Although chlorinated polyphenyls can be used as solubilizers for sulfur, ecological considerations make it desirable that alternate solubilizers for sulfur be available. Many common plasticizers have been found to provide insufficient solubility for the sulfur at normal ambient temperature, e.g., at about 25° C., to be satisfactory as solubilizers for the sulfur. On the other hand, the solubility of elemental sulfur in the hydrogenated polyphenyls for use in the process of this invention is quite adequate, and the compatibility or degree of miscibility of the hydrogenated polyphenyls with the polymer is excellent. Furthermore, a tougher product is produced, upon curing the polymer, when hydrogenated polyphenyls instead of chlorinated polyphenyls are used as solubilizers.

The hydrogenated polyphenyls for use in this invention can be either partially or completely hydrogenated polyphenyls. Polyphenyls from which applicable hydrogenated polyphenyls can be prepared can be represented by the formula:

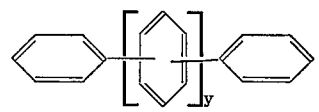

wherein y is 0, 1, or 2. Thus, polyphenyls which can be employed to produce applicable hydrogenated polyphenyls include biphenyl, o-terphenyl, m-terphenyl, p-terphenyl, each of the isomeric quaterphenyls, and mixtures of the various polyphenyls represented by the above formula. Although the hydrogenated quaterphenyls are applicable, hydrogenated biphenyl and hydrogenated terphenyls, and mixtures thereof, are the hydrogenated polyphenyls preferred for use in this invention.

Hydrogenation of the polyphenyls to give applicable hydrogenated polyphenyls can be carried out by conventional processes in which aromatic nuclei undergo hydrogenation. Thus, hydrogenation of the polyphenyls can be conducted through the use of catalysts such as platinum black, colloidal platinum, platinum oxide, Raney nickel, nickel on kiselguhr, and the like, in solvents such as acetic acid, ethanol, and the like, in a hydrogen atomsphere, preferably at superatmospheric pressure. It is desirable that hydrogenation of the polyphenyls be carried out until at least about 10 percent, and preferably about 20 percent to about 80 percent, of the double bonds in the aromatic nuclei are hydrogenated to obtain hydrogenated polyphenyls applicable in the process of this invention.

The poly(oxyalkylene)-polyester - poly( monosulfide)-polythiols having an average of more than two mercaptan groups per molecule suitable for the present invention can be produced by reacting at least one mercaptoalkanoic acid and at least one thiodialkanoic acid with poly(oxyalkylene)-polyols having an average of more than two hydroxy groups per molecule.

The mercaptoalkanoic acids which can be used to prepare the poly(oxyalkylene) - polyester-poly(monosulfide)-polythiols can be represented by the formula HS(CR$_2$)$_n$COOH, wherein each R is hydrogen or an alkyl radical having 1 to about 5 carbon atoms, with a total of not more than about 10 carbon atoms in all R groups per molecule; and wherein n is an integer in the range of 1 to about 5. Examples of some mercaptoalkanoic acids which can be employed include mercaptoacetic acid, 3-mercaptopropionic aid, 2-mercaptopropionic acid, 4-mercaptobutyric acid, 3-isopropyl-5-meraptovaleric acid, 2-ethyl-3-tert-butyl - 5-mercaptovaleric acid, 2-propyl-3-mercaptoheptanoic acid, 3-pentyl-6-mercaptoundecanoic acid, and the like, and mixtures thereof The thiodialkanoic acids which can be employed in the production of the poly(oxyalkylene)-polyester-poly (monosulfide)-polythiols can be represented by the formula HOOC(CR$_2$)$_n$S(CR$_2$)$_n$COOH, wherein R and n are as defined above, with a total of not more than about 20 carbon atoms in all R groups per molecule. Examples of suitable thiodialkanoic acids which can be used include thiodiacetic acid, 3,3'-thiodipropionic acid, 2,2'-thiodipropionic acid, 2,3'-thiodipropionic acid, 4,4'-thiodibutyric acid, 5,5'-thiobis(3-isopropylvaleric acid), 5,5'-thiobis(2-ethyl-3-tert-butylvaleric acid), 3,3'-thiobis(2-propylheptanoic acid), 6,6' - thiobis(3-pentylundecanoic acid), 4-carboxymethylthiovaleric acid, and the like, and mixtures thereof.

A particularly preferred procedure for reacting the mercaptoalkanoic acids and thiodialkanoic acids with the poly(oxyalkylene)-polyols is to use a mixture of mercaptoalkanoic and thiodialkanoic acids. Generally, it is preferred to employ mixtures comprising 5 to 95 weight percent mercaptoalkanoic acid, more preferably 60 to 80 weight percent mercaptoalkanoic acid. Such mixtures of mercaptoalkanoic and thiodialkanoic acids can be prepared according to various procedures. For example, suitable mixtures can be prepared by mixing mercaptoalkanoic acids with thiodialkanoic acids. The presently preferred procedure for preparing such mixtures of mercaptoalkanoic and thiodialkanoic acids is by hydrolyzing a mixture of mercaptonitriles and thiodinitriles which can be produced from alkenenitriles and hydrogen sulfide according to processes known to the art such as that described in U.S. Pat. 3,280,163. For example, according to a presently preferred procedure, acrylonitrile can be reacted with hydrogen sulfide in the presence of sulfur and a weak organic base to form a mixture consisting largely of 3-mercaptopropionitrile and 3,3'-thiodipropionitrile, containing minor amounts of other nitriles, which mixture can be subsequently hydrolyzed, without the necessity of separation, to form a suitable mixture of largely 3-mercaptopropionic acid and 3,3'-thiodipropionic acid, together with minor amounts of other carboxylic acids. Representative examples of nitriles that can be used are set forth in U.S. Pat. 3,280,163.

The poly(oxyalkylene)-polyols used in the preparation of the poly(oxyalkylene)-polyester-poly(monosulfide)-polythiols employed in this invention have an average of more than 2, preferably at least 2.5, hydroxy groups per molecule and molecular weights of from about 200 to about 20,000. These substances can be produced by the reaction of one or more epoxy-substituted hydrocarbons having the general formula

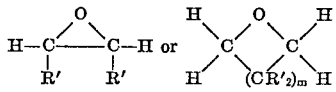

wherein each R' is hydrogen or an alkyl radical, the total number of carbon atoms per molecule being within the range of 2 to about 20, and $m$ is an integer of from 1 to about 10, preferably 1 to 3, with a polyol having the formula $Y(OH)_x$, wherein Y is a hydrocarbon radical having at least 2, preferably 3 to about 40, carbon atoms, and a valence equal to the value of $x$, $x$ is an integer of at least 2 and preferably 3 to about 12, and the number of carbon atoms per molecule of $Y(OH)_x$ is equal to or greater than $x$. Preferably Y is a saturated aliphatic, saturated cycloaliphatic, or aromatic radical, or combination thereof, having at least 3 hydroxy groups per molecule. Examples of some polyols which can be used include ethylene glycol, glycerol, 1,3-propanediol, 2-butene-1,4-diol, erythritol, pentaerythritol, tris(hydroxymethyl)methane, 3-(hydroxymethyl)-1,5-pentanediol, 1,2,6-hexanetriol, 2-methyl-1,2,4,6,8,10-decanehexol, 1,2,4,6,7,9,12,14,15,17, 19,20-eicosanedodecol, 1,2,40-tetracontanetriol, 4-cyclohexane-1,2-diol, 1,4-cyclohexanediol, 1,5,9-cyclododecanetriol, 1,2,3,4-cyclopentanetetrol, 2-methyl-1,3,5-cyclooctanetriol, 4-(1,2-dihydroxyethyl)cyclohexanol, resorcinol, phloroglucinol, 2,4,6-trihydroxytoluene, α,α-bis(p-hydroxyphenyl)benzyl alcohol, 1,4,5,8-naphthalenetetrol, and the like, and mixtures thereof. Examples of some epoxy-substituted hydrocarbons which can be used in the preparation of the poly(oxyalkylene)-polyols include 1,2-epoxyethane, 1,2-epoxypropane, 1,3-epoxypropane, 1,4-epoxybutane, 1,5-epoxypentane, 3-methyl-1,8-epoxyoctane, 4-octyl-1,12-epoxydodecane, 3-ethyl-5-isopropyl-1, 10-epoxydecane, 2-butyl-1,6-epoxyhexane, 3-decyl-1,5-epoxypentane, 2-heptadecyl-1,3-epoxypropane, 1,2-epoxybutane, 2-methyl-3,4-epoxyheptane, 1,2-epoxyoctane, 2,3-epoxydodecane, 4-ethyl-1,2-epoxytetradecane, 1,2-epoxyeicosane, and the like, and mixtures thereof.

The poly(oxyalkylene)-polyols can be prepared by contacting at least one polyol of the formula $Y(OH)_x$, as defined above, with an epoxy-substituted hydrocarbon, as defined above, under suitable polymerization conditions, as is known to the art. For instance, glycerol or 1,2,6-hexanetriol can be contacted with an excess of propylene oxide (1,2-epoxypropane) under elevated pressure and in the presence of suitable polymerization promoters. Products of this type can be obtained from commercial sources. In the preparation of poly(oxyalkylene)-polyols having an average of more than 2 hydroxy groups per molecule, mixtures of the above polyols such as at least one diol and another polyol of higher functionality can be reacted with the epoxy-substituted hydrocarbons defined above to form poly(oxyalkylene)-polyols having an average of more than two hydroxy groups per molecule. For instance, a mixture of 1,4-buantediol and 1,2,6-hexanetriol can be reacted with ethylene oxide to produce a poly-(oxyethylene)-polyol having an average of more than two hydroxy groups per molecule. Alternatively, a poly-(oxyalkylene)-polyol produced, e.g., by the reaction of a diol such as ethylene glycol with an alkylene oxide such as propylene oxide can be mixed with another poly(oxyalkylene)-polyol produced, e.g., by the reaction of a triol such as 1,2,6-hexanetriol with an alkylene oxide such as propylene oxide.

The mixtures of mercaptoalkanoic acids and thiodialkanoic acids can be reacted with the poly(oxyalkylene)-polyols to form poly(oxyalkylene)-polyester-poly(monosulfide)-polythiols by an esterification reaction which can be effected in any suitable equipment at temperatures preferably in the range of about 50 to about 250° C. Preferably the reaction is conducted in the presence of diluents that are substantially completely inert to the reactants and products under the reaction conditions employed. Such diluents can comprise as much as 95 weight percent of the components charged to the reactor. Acid esterification catalysts such as p-toluenesulfonic acid, benzenesulfonic acid, sulfuric acid, and the like can also be employed, if desired, to accelerate the rate of reaction. In that event, the diluents employed also should be inert to the acid catalyst. Examples of suitable diluents include toluene, benzene, xylene, cyclohexane, heptane, and the like, and mixtures thereof. The reaction pressure should be sufficient to prevent excessive loss of reactants and/or solvent at operating temperatures. Satisfactory pressures are normally within the range of about 0.5 to about 10 atmospheres. It is normally desirable to provide a means of removing water of reaction during the course of the esterification. This function can be accomplished by means known to the art, e.g., by azeotropic distillation. The properties of the poly(oxyalkylene)-polyester-poly-(monosulfide)-polythiols will vary somewhat depending upon the reactants employed, the ratios of the various reactants, and other reaction conditions. Normally these polymers will be viscous liquid short-chain polymers, the chain length depending to considerable extent on the ratio of thiodialkanoic acid to mercaptoalkanoic acid used. In general, higher ratios of thiodialkanoic acid to mercaptoalkanoic acid yield longer polymer chains and a more viscous liquid or near solid product.

The esterification reaction should be effected to such an extent that at least about 80 percent of the hydroxy groups of the poly(oxyalkylene)-polyol are reacted with carboxy groups of the mercaptoalkanoic acid or thiodialkanoic acid to form ester groups. In general, in the range of about 0.8 to about 1.2 equivalents of hydroxy groups of the poly(oxyalkylene)-polyol should be employed for each equivalent of carboxy groups of the mercaptoalkanoic acid and thiodialkanoic acid. In general, an average of more than 2, preferably at least 2.5, ester groups are formed for each molecule of poly(oxyalkylene)-polyol. Following the esterification reaction, the poly(oxyalkylene)-polyester-poly(monosulfide)-polythiol product can be neutralized, e.g., with ammonium hydroxide, calcium hydroxide, or the like, prior to compounding into the desired sealant or coating formulation.

The amount of elemental sulfur incorporated in the hydrogenated polyphenyl solubilizer can vary over a considerable range and will be an amount sufficient to provide some curing of the polymer and promote adhesion of the resulting cured formulation. The amount of elemental sulfur in the hydrogenated polyphenyl generally will be within the range of about 0.1 to about 4, preferably about 0.5 to about 2.5, weight percent, based on the weight of hydrogenated polyphenyl plus sulfur. The amount of hydrogenated polyphenyl plus sulfur dissolved therein which is mixed with the poly(oxyalkylene)-polyester-poly(monosulfide)-polythiol should be such as to provide about 0.004 to about 0.4, preferably about 0.03 to about 0.1, part by weight sulfur per 100 parts by weight poly(oxyalkylene)-polyester-poly(monosulfide)-polythiol. Although the temperature at which the mixing is conducted is not critical, it is normally most convenient to mix the components at approximately ambient temperature, e.g., about 25° C.

Materials that can be employed together with the poly(oxyalkylene)-polyester-poly(monosulfide)-polythiol, hydrogenated polyphenyl, and elemental sulfur in sealant and coating formulations include any material conventionally used as a non-elastomeric component of sealant and coating formulations, e.g., fillers, pigments, plasticizers, extenders, stabilizers, thickeners, other modifiers, and the like such as calcium carbonate, titanium dioxide, silica, iron oxide, carbon black, dibutyl phthalate, chlorinated hydrocarbons, alumina, zirconia, polyethylene, polystyrene, 2,2'-methylenebis(4-methyl-6-tert-butylphenol), and the like.

The order of addition of the non-elastomeric components is not critical although it is usually most convenient to add first to the poly(oxyalkylene)-polyester-poly(monosulfide)-polythiols the liquids or relatively low melting solids such as the hydrogenated polyphenyls containing dissolved sulfur, and any plasticizers or extenders, followed by solid components such as fillers and pigments, thickeners preferably being the last of the components to be added to constitute the premix. If desired, hydrogenated polyphenyls can be used as plasticizers or extenders. To the premix is added the curing agent, preferably along with or preceded by water to serve as a binder for the thickener, if employed in the premix, and an adhesion promoter, e.g., partially hydrolyzed gamma-glycidoxypropyltrimethoxysilane.

The blending of ingredients can be achieved by conventional methods such as hand-mixing or machine-blending, the particular technique depending in part upon available equipment and the requirements of the sealant or coating application problem.

The amount of poly(oxyalkylene)-polyester-poly(monosulfide)-polythiol present in the sealant or coating formulations containing non-elastomeric components will vary appreciably depending upon the desired final characteristics of the sealant or coating composition. However, in general, the amount of poly(oxyalkylene)-polyester-poly(monosulfide)-polythiol present in the sealant or coating formulation, excluding curing agent, will range from about 25 to 98 percent by weight, preferably being within the range of about 40 to about 80 percent by weight. The remainder can comprise non-elastomeric components in varying proportions depending upon the characteristics of the poly(oxyalkylene)-polyester-poly(monosulfide)-polythiol and the final composition desired.

The poly(oxyalkylene)-polyester-poly(monosulfide)-polythiols in the sealant or coating formulations of this invention can be cured with conventional curing agents including free oxygen-containing fluids such as, for example, air; peroxy compounds such as, for example, di-tert-butyl peroxide and cumene hydroperoxide; metal oxides such as, for example, the oxides of lead, zinc, manganese, calcium, barium, copper, mercury, tin, and iron; metal salts of carboxylic acids such as for example, lead stearate, zinc laurate, and zinc acetate; ammonium and alkali metal chromates and persulfates; sulfur; and the like. The curing time will vary with the polymer, the curing agent, the sealant or coating formulation, and the temperature. In general, sufficient curing agent is employed to convert at least about 70 percent of the mercapto groups in the polymer to polysulfide linkages.

The sealant and coating formulations of this invention can be employed to join or coat various substrates. For example, substrates such as wood, plastics, glass, stone such as granite, marble, or the like, concrete, or metal such as aluminum, steel, iron, zinc, or the like can be joined or coated.

EXAMPLE I

A poly(oxyalkylene)-polyester-poly(monosulfide)-polythiol was prepared in the following manner.

The sulfur-2-methyl-5-ethylpyridine-catalyzed reaction of hydrogen sulfide with acrylonitrile was conducted by the process of U.S. Pat. 3,280,163 to provide a nitrile mixture having the following composition:

| Component | Weight percent |
|---|---|
| Lights | 6.2 |
| 3-Mercaptopropionitrile | 70.8 |
| 2,3'-Thiodipropionitrile | 3.9 |
| 3,3'-Thiodipropionitrile | 17.7 |
| 3,3'-Dithiodipropionitrile | 1.4 |

To effect hydrolysis, the above mixture in an amount of 270 g. was heated to 85° C., with stirring, in a 22-liter 3-necked flask, after which 425 ml. of concentrated hydrochloric acid was added slowly over a period of 45 minutes. The mixture was heated to 110° C. for 3 hours. Water and hydrochloric acid were then evaporated by heating at 100° C. at a pressure of 30–40 mm. Hg, after which 3000 ml. of xylene was added, and the residual water was removed by azeotropic distillation. Analysis of an aliquot sample of the supernatant xylene solution above the ammonium chloride by-product showed the xylene solution contained 3.04 gram-equivalents of carboxylic acids, the distribution being about 1.90 gram-equivalents of 3-mercaptopropionic acid and about 1.14 gram-equivalents of dicarboxylic acids comprising largely 3,3'-thiodipropionic acid with minor amounts of 2,3'-thiodipropionic and 3,3'-dithiodipropionic acids.

To effect esterification, 4635 g. Niax LHT–34 poly(oxyalkylene)-polyol (derived from 1,2,6-hexanetriol and propylene oxide, and having an equivalent weight of 1605 and a hydroxyl number of 34.9), 46.4 g. p-toluenesulfonic acid monohydrate, and 1479 ml. xylene were charged to the 3-necked flask containing the above mixture of carboxylic acids in xylene, as well as undissolved ammonium chloride. The ratio of hydroxy groups in the poly(oxyalkylene)-polyol to carboxy groups in the mixture of acids was about 0.95:1. The resulting mixture was refluxed for 16 hours, during which time 57 ml. of azeotroped water was collected. The reaction mixture was cooled to 25° C., after which 8000 ml. xylene and 150 g. lime were added. The mixture was stirred for one hour, 75 g. additional lime and 1000 ml. additional xylene were added, and the mixture was again stirred one hour. The mixture was then filtered through Celite filter-aid, and solvent was removed from the filtrate by heating to 105° C./<2 mm. Hg to obtain as the residual product the desired poly(oxyalkylene)-polyester-poly(monosulfide)-polythiol having a viscosity of 6040 cps. at 25° C., a mercaptan sulfur content of 0.99 weight percent, and an acid number (mg. KOH/g. sample) of <0.1.

With 500 parts by weight of the above poly(oxyalkylene)-polyester-poly(monosulfide)-polythiol were mixed 100 parts by weight titanium dioxide, 200 parts by weight calcium carbonate, 5 parts by weight Cyanamid 2246 antioxidant [2,2' - methylenebis(4 - methyl-6-tert-butylphenol)], 10 parts by weight of a solution consisting of 0.02 part by weight elemental sulfur per 1 part by weight HB-40 partially hydrogenated terphenyl (Monsanto Company), and 30 parts by weight Cab-O-Sil fumed silica. Based on nuclear magnetic resonance analysis and on carbon and hydrogen analysis the terphenyl used was approximately 50 percent hydrogenated. With 21.185 parts by weight of the resulting premix were mixed 1.56 parts by weight Aroclor 6062 chlorinated polyphenyls (mixture of monochlorinated biphenyl and polychlorinated terphenyl from Monsanto), 0.75 part by weight of a 1:1 by weight mixture of lead dioxide and dibutyl phthalate, 0.273 part by weight water, and 0.125 part by weight partially hydrolyzed gamma-glycidoxypropyltrimethoxysilane (an aliquot of the product prepared from 472 parts by weight gamma-glycidoxypropyltrimethoxysilane and 72 parts by weight water). The resulting mixture was then cast into a picture frame mold 2½ inches x 2½ inches x ⅛ inch, and the composition was allowed to cure at ambient room temperature (about 25° C.) for 14 days. The cured composition was removed from the frame, and tensile strength, elongation, and modulus of a sample specimen 2½ inches x ⅛ inch x ⅛ inch were determined by the method of ASTM D 638-56T. The properties of this cured sealant, prepared in accordance with the process of this invention and herein designated as Cured Sealant A, are shown in Table I.

Also shown in Table I, for comparative purposes, are properties determined in like manner of a cured sealant, herein designated as Cured Sealant Control, prepared outside the scope of the process of this invention. In the preparation of this product, a nitrile mixture prepared as described above and having essentially the same composition as shown above was hydrolyzed in essentially the same manner described above to produce a mixture of acids which was esterified as described above. The resulting poly(oxyalkylene)-polyester-poly(monosulfide)-polythiol had a viscosity of 6500 cps. at 25° C., a mercaptan sulfur content of 1.05 weight percent, and an acid number (mg. KOH/g. sample) of 0.65, and was essentially the same as the polymer used in the preparation of Cured Sealant A. The poly(oxyalkylene)-polyester-poly(monosulfide)-polythiol was formulated into a premix which was then mixed with the curing agent and other ingredients, and the resulting mixture was allowed to cure, all as described for the preparation of Cured Sealant A except that (1) 10 parts by weight of a solution consisting of 0.02 part by weight elemental sulfur per one part by weight Aroclor 6062 chlorinated polyphenyls was used instead of 10 parts by weight of a solution consisting of 0.02 part by weight elemental sulfur per one part by weight HB-40 partially hydrogenated terphenyl, and (2) the 1.56 parts by weight Aroclor 6062 chlorinated polyphenyls was added during preparation of the premix instead of subsequent to its preparation. This latter deviation from the procedure used in the production of Cured Sealant A would have no significant effect on the properties of the cured sealant. Therefore, differences in the properties of Cured Sealant A and Cured Sealant Control are due to the use of HB-40 partially hydrogenated terphenyl, instead of Aroclor chlorinated polyphenyls, as a solubilizer for the elemental sulfur.

TABLE I

|  | Cured Sealant A | Cured Sealant Control |
| --- | --- | --- |
| 50% modulus, p.s.i. | 54 | 48.6 |
| Tensile break, p.s.i. | 316 | 248.7 |
| Elongation, percent | 505 | 514 |

Based on the values for 50 percent modulus and tensile break as shown in Table I, Cured Sealant A, prepared by the process of this invention through use of partially hydrogenated terphenyl, exhibited greater toughness than Cured Sealant Control, which was produced outside the scope of this invention. In each instance the percent elongation was good and essentially equivalent.

EXAMPLE II

In a series of tests various known plasticizers were evaluated as solubilizers for elemental sulfur. In each test a mixture of 2 parts by weight sulfur and 100 parts by weight plasticizer was heated to 140° C., after which the resulting mixture was cooled to about 25° C., at which temperature it was allowed to stand for about 24 hours. The cooled mixture was then observed to determine if undissolved sulfur was present. In the tests conducted in this manner undissolved sulfur was observed in the cooled mixture when the plasticizer used was any one of the following: dicapryl phthalate, diisodecyl adipate, di-2-ethylhexyl sebacate, dioctyl azelate, dibutyl phthalate, dinonyl phthalate, octyl decyl phthalate, diisooctyl sebacate, dinonyl adipate, dioctyl phthalate, dinonyl sebacate, diisooctyl adipate, tri-2-ethylhexyl phosphate, or dihexyl azelate. In contrast, observation of the cooled mixture in which HB-40 partially hydrogenated terphenyl was the plasticizer used indicated the sulfur was completely dissolved, thus illustrating the superiority of HB-40 partially hydrogenated terphenyl over a number of other common plasticizers as a solubilizer for sulfur. The compatibility of HB-40 partially hydrogenated terphenyl, as well as of each of the other plasticizers evaluated and named in this example, with a sample of poly(oxyalkylene)-polyester-poly(monosulfide)-polythiol was excellent, based on the observation that a mixture of 10 parts by weight of the polymer with 5 parts by weight of the plasticizer was completely miscible at room temperature (about 25° C.).

We claim:
1. Curable sealant and coating compositions comprising
   (a) a poly(oxyalkylene)-polyester-poly(monosulfide)-polythiol having an average of more than two mercapto groups per molecule, and
   (b) a hydrogenated polyphenyl containing dissolved sulfur, the amount of sulfur present being sufficient to provide some curing of the polymer.
2. A composition according to claim 1 which contains
   (c) a curing agent in an amount sufficient to convert at least about 70 percent of the mercapto groups to polysulfide linkages.
3. A composition according to claim 1 wherein said hydrogenated polyphenyl is prepared from a polyphenyl represented by the formula

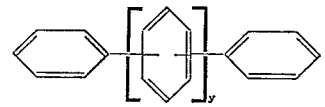

wherein y is 0, 1, or 2.
4. A composition according to claim 2 which additionally contains non-elastomeric components selected from fillers, plasticizers, antioxidants, adhesion promoters, and the like.
5. A composition according to claim 2 wherein (a) comprises from about 25 to about 98 weight percent of the composition, (b) comprises an amount of hydrogenated polyphenyl plus sulfur dissolved therein sufficient to provide about 0.004 to about 0.4 parts by weight sulfur per 100 parts by weight (a), and the remainder being non-elastomeric components selected from fillers, plasticizers, antioxidants, adhesion promoters, and the like.

6. A composition according to claim 1 wherein (a) is the reaction product of
 (1) a mercaptoalkanoic acid having the formula $HS(CR_2)_nCOOH$ wherein R is selected from the group consisting of hydrogen and alkyl radicals having from 1–5, inclusive, carbon atoms, the maximum number of carbon atoms in all R groups being 10, and $n$ is an integer ranging from 1–5,
 (2) a thiodialkanoic acid having the formula $HOOC(CR_2)_nS(CR_2)_nCOOH$ wherein R and $n$ are as defined above, the maximum number of carbon atoms in all R groups being 20, and
 (3) a poly(oxyalkylene)-polyol having on average more than two pendent hydroxy groups per molecule and a molecular weight in the range 200–20,000, the amount of (3) being in the range 0.8–1.2 equivalents of pendent hydroxy groups for each equivalent of carboxylic groups of the mercaptoalaknoic and thiodialkanoic acids.

7. A composition according to claim 6 wherein (a) is formed by reacting
 (1) 3-mercaptopropionic acid,
 (2) thiodipropionic acid, and
 (3) a poly(oxyalkylene)-polyol formed by reacting 1,2,6-hexanetriol and propylene oxide, and further wherein the amount of (1) employed ranges from 60 to 80 weight percent based upon the total of (1) and (2).

8. A composition according to claim 2 wherein said curing agent (c) is lead dioxide, and said hydrogenated polyphenyl is partially hydrogenated terphenyl which has been hydrogenated to the extent that about 20 to about 80 percent of the double bonds in the aromatic nuclei have been hydrogenated.

9. A process for the production of sealant and coating compositions which process comprises incorporating into a poly(oxyalkylene)-polyester-poly(monosulfide)-polythiol having an average of more than two mercapto groups per molecule a hydrogenated polyphenyl containing dissolved sulfur and an additional curing agent, the amount of sulfur present being sufficient to effect some curing of the polymer and promote adhesion of the resulting cured product, the total amount of curing agent present being sufficient to convert at least about 70 percent of the pendent thiol groups to polysulfide groups, and allowing the thus-prepared formulation to cure to form sealant and coating compositions having improved toughness.

10. A process according to claim 9 wherein said polythiol is formed by reacting 3-mercaptopropionic acid, thiodipropionic acid and a poly(oxyalkylene)-polyol formed by reacting 1,2,6-hexanetriol and propylene oxide, and said hydrogenated polyphenyl is prepared from a polyphenyl having the formula

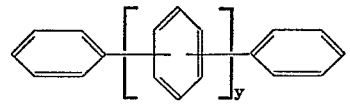

wherein $y$ is 0, 1, or 2.

11. A process according to claim 9 wherein the curing agents are sulfur and lead dioxide and further wherein non-elastomeric components selected from fillers, plasticizers, antioxidants, and adhesion promoters are incorporated into the formulation.

References Cited

UNITED STATES PATENTS 3,717,617    2/1973    Marrs et al. _____ 260—75 S

OTHER REFERENCES

Modern Plastics *32*, No. 6, 139–48, 153 (1955).
Technical Bulletin No. PL–40, Monsanto Chem. Co., St. Louis, Mo., 1963.

MELVIN GOLDSTEIN, Assistant Examiner

U.S. Cl. X.R.

260—33.6 R